Nov. 12, 1968  E. A. MEYER  3,410,045
CLIP AND MOLDING ASSEMBLY
Filed Sept. 7, 1966  3 Sheets-Sheet 1
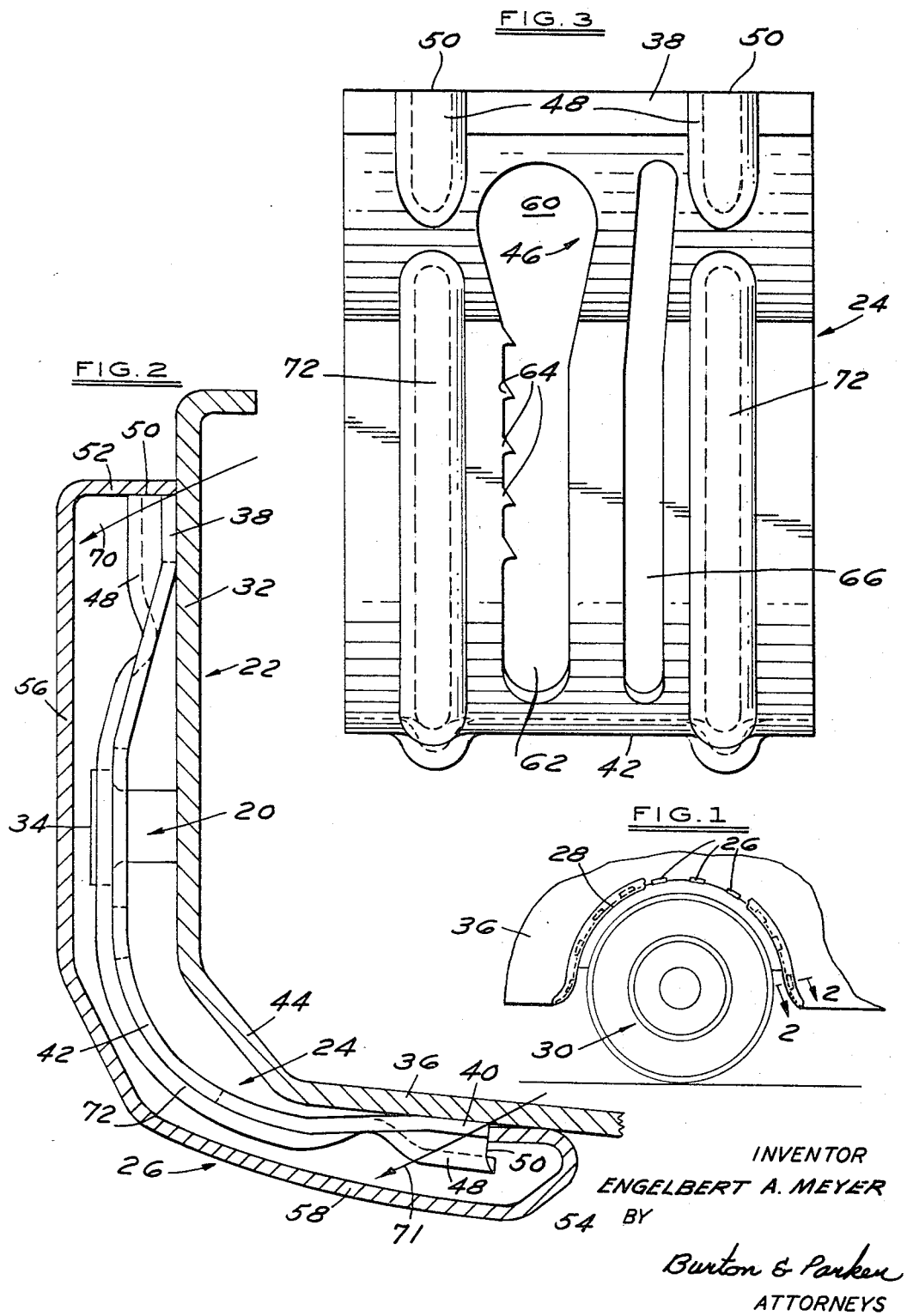
INVENTOR
ENGELBERT A. MEYER
BY
Burton & Parker
ATTORNEYS Nov. 12, 1968  E. A. MEYER  3,410,045
CLIP AND MOLDING ASSEMBLY
Filed Sept. 7, 1966  3 Sheets-Sheet 2
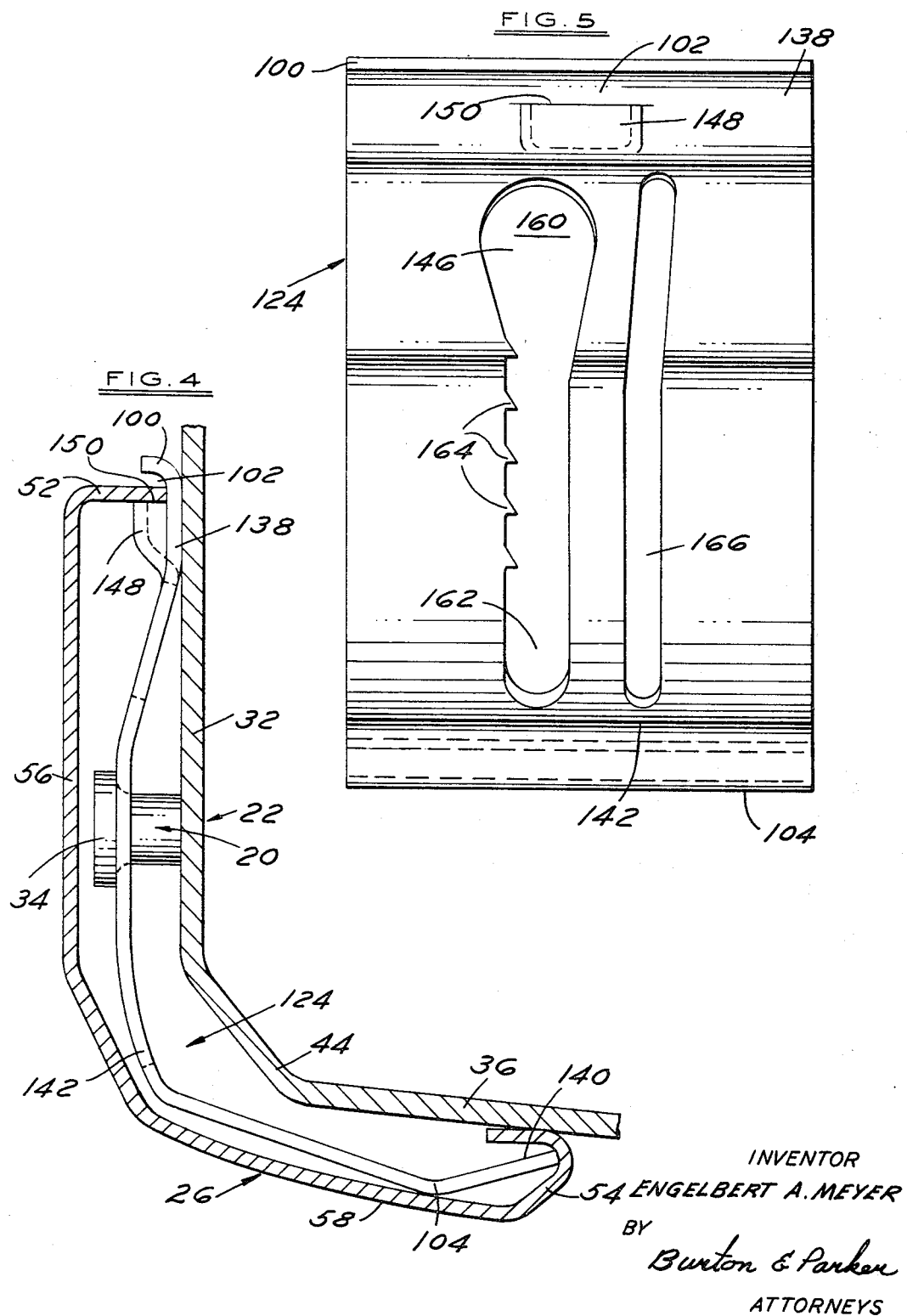
INVENTOR
ENGELBERT A. MEYER
BY
Burton & Parker
ATTORNEYS Nov. 12, 1968   E. A. MEYER   3,410,045
CLIP AND MOLDING ASSEMBLY
Filed Sept. 7, 1966   3 Sheets-Sheet 3
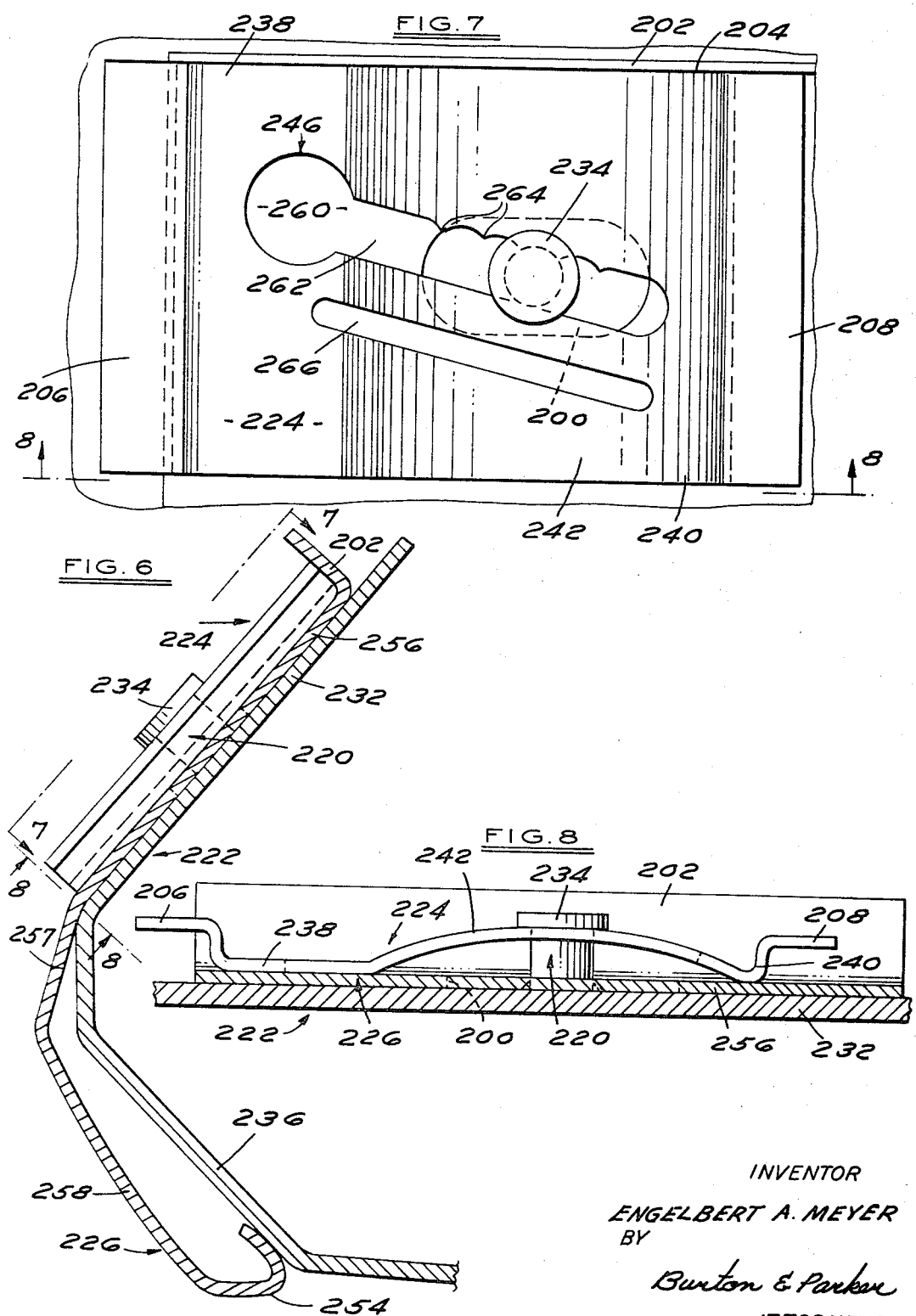
INVENTOR
ENGELBERT A. MEYER
BY
Burton & Parker
ATTORNEYS United States Patent Office 3,410,045
Patented Nov. 12, 1968

3,410,045
CLIP AND MOLDING ASSEMBLY
Engelbert A. Meyer, Union Lake, Mich., assignor to Warren Fastener Corporation, Mount Clemens, Mich., a corporation of Michigan
Filed Sept. 7, 1966, Ser. No. 577,713
13 Claims. (Cl. 52—718)

ABSTRACT OF THE DISCLOSURE

This disclosure relates to a clip and molding assembly adaptable to secure a structural member, such as a trim piece, over the corner of a support. The clip in the preferred embodiment is tensioned beneath a button secured to the support, against each of the angularly related corner surfaces, and the trim piece or structural member is expanded to be received over the opposed clip edges. In the other embodiment, the structural member is received directly on the support, and provides an upstanding flange which is engaged by the clip. The slot in the clip which receives the button is defined at an acute angle to the clip edge which abuts the flange of the structural member to tension the clip against the structural member flange. In each of the embodiments disclosed herein, the marginal edge of the button receiving slot has teeth to restrict removal of the button, and a second generally parallel slot which permits the button receiving slot to expand and receive the shank of the button.

---

This invention relates to an improved clip and molding assembly. More particularly, this invention relates to a clip fastener adapted to secure a molding device to a support in overlying relation. The clip of this invention is particularly, although not exclusively, adapted to securing a molding channel over a pair of angularly related support surfaces, such as the corner of an automotive wheel opening where the clip must be attached to the support on a downwardly facing surface, and the molding channel extends from within the wheel opening to overlie the vertical side panel of the automobile.

Molding devices are used in the manufacture of automobiles, refrigerator and appliance housings, and the like to meet design and functional requirements. Previously used molding securement techniques required a hole in the support panel, and a bolt or clip assembly extended through the panel opening to secure the molding. More recently this method was replaced by the weld on fastener system, wherein relatively small headed buttons are secured to the panel, and a clip or adapter is received on the button to secure the molding channel. Examples of the weld on fastener system may be found in my United States Letters Patent Nos. 3,239,988, 3,246,440, and Sweeney's United States Letters Patent No. 3,222,838.

Preferably, the button is attached to the support in accordance with the method described in United States Letters Patent 3,153,468, which is assigned to the assignee of the instant application, wherein the button is welded to steel or adhesively secured to various materials including steel, thereby eliminating the corrosion problems inherent in previously used techniques requiring a hole through the support. Another advantage is the substantial reduction in storage requirements made possible by the weld on system. Separate inventory of common body panels and the like, necessitated by the use of different trim arrangements, may be eliminated because the buttons are welded on in the assembly line. A series of spaced buttons for a single longitudinal molding device may be applied in a gang operation with accurate alignment.

The button of the weld on system is small when compared to previously employed fasteners in the automotive field. A suitable size button, presently used in the mass production of automobiles, involves a button which is 0.200 inch in diameter at its head, 0.160 inch in height; the diameter of the shank being slightly greater than one half the diameter of the head.

Utilization of the weld on fastener system in the automotive field has provided substantial economies and advantages over previous methods. Similar usefulness and advantages may be obtained in other fields, such as appliances, refrigerators, stoves and the like.

The instant application will be described in the context of an automotive molding assembly.

The improved molding clip of this invention was designed to meet a particular fastener requirement, that of attaching a molding device over the corner of an automotive wheel opening, however the inventive concepts taught herein are equally useful in other applications. The button and molding clip are preferably concealed within the wheel opening for design reasons, and the assembly may be concealed beneath the molding channel according to one embodiment of this invention.

A problem in the design of a molding assembly which meets this requirement results from the fact that the button of a weld on fastener assembly is attached prior to the clip and the trim, and the relatively small button which may be characterized as BB shot size.

The improved molding clip of this invention may be formed from sheet metal stock in a continuous die operation. According to one embodiment of my invention, the clip is generally C-shaped to overlie the angularly related support surfaces, with the ends of the clip tensioned toward the support and the mid portion bowed outwardly from the plane of the ends. The mid portion is tensioned beneath a button head, and the button is secured to the support. The molding clip ends may be provided with tang means, which extend upwardly from the plane of the support surface to receive complementary downwardly extending opposed lateral flange portions of the molding channel. The molding flanges are expanded to lock in place against the opposed tangs. In an automotive wheel opening, the panel surfaces define substantially a right angle, and the molding flanges are securely retained without the need of an overlying clip portion. The molding channel has a pair of angularly related portions complementary to the support surfaces, and a mid portion which overlies and conceals the juncture of the angularly related support surfaces. The opposed tangs of the clip extend generally perpendicular to the support surfaces, or overlie the molding ends at an acute angle to the support, so that an arc defined from either molding clip tang, adjacent the support surface, passes through the opposed upwardly extending tang, and the molding is securely retained. This relationship will be more fully explained hereinbelow with reference to the drawings.

The clip is provided with a key hole slot, having an enlarged opening which receives the button head therethrough, and a slot portion whose edges define a button seat. According to this embodiment of the molding clip, the communication to the button seat is restricted by a series of teeth, defined on an edge of the key hole slot portion, to inhibit withdrawal of a button received on the button seat. In this embodiment, a second slot is defined in the molding clip adjacent and generally parallel to the key hole slot portion, which provides the resiliency in the molding clip required to allow seating of a button past the teeth.

According to another embodiment of the molding assembly of this invention, at least one lateral flange of the molding device extends inwardly to be received beneath an edge of the molding clip, and is tensioned against a surface of the support. In this embodiment, the opposed molding flange is received on a lip defined on the molding clip adjacent the opposed tang, to space the flange from the support surface and prevent scratching of the support during assembly.

According to still another embodiment of the molding assembly of this invention, the molding is provided with an opening which receives the button therethrough, and the molding device is received directly on the support surfaces. In this embodiment, the clip is tensioned beneath the button head against the molding channel and the key hole slot may be defined at an acute angle to the lateral edge of the clip. The lateral edge of the clip is tensioned against an upwardly extending flange of the molding device, when seated on the button, to securely lock the assembly.

Other objects, advantages, and meritorious features will more fully appear from the following specification, claims, and accompanying drawings wherein.

FIGURE 1 is a partial side view of an automotive wheel opening, partially cut away to show the molding clips;

FIGURE 2 is a cross sectional view of the molding assembly of this invention in the direction of view arrows 2—2 of FIGURE 1;

FIGURE 3 is a top elevation of the molding clip shown in FIGURE 2;

FIGURE 4 is a cross sectional view of another embodiment of the molding assembly of this invention, similar to FIGURE 2;

FIGURE 5 is a top view of the clip shown in FIGURE 4;

FIGURE 6 is a cross sectional view of another embodiment of the molding assembly of this invention, similar to FIGURES 2 and 4;

FIGURE 7 is a top view of the molding assembly of FIGURE 6, in the direction of view arrows 7—7; and FIGURE 8 is a cross sectional view of the molding assembly of FIGURE 6 in the direction of view arrows 8—8.

Referring to the embodiment of my invention shown in FIGURES 1 to 3, the molding assembly includes a button 20 secured to the surface of a support 22, a generally C-shaped molding clip 24, and a molding device 26 configured to overlie and substantially conform to the angularly related surfaces of the support. In this embodiment, the button is concealed within an automobile wheel opening 28, shown in FIGURE 1. FIGURE 1 illustrates, somewhat schematically, the structure of an automobile adjacent the wheel 30, as an example of the environment in which the molding assembly of FIGURE 2 might be utilized. A series of spaced buttons are secured to the body panel 32 which extends into the wheel opening, and an equal number of clips 26 are secured beneath the enlarged head 34 of the buttons, and extend to overlie the vertical body panel 36.

The opposed ends 38 and 40 of the molding clip are tensioned against the angularly related surfaces of the support 32 and 36, respectively, and the mid portion 42 is bowed from the plane of the clip ends to overlie and conceal the juncture of the opposed surfaces 44. The mid portion of the clip 42 has a key hole slot, generally referred in FIGURE 3 as 46, which receives the headed button 20 therethrough for tensioning the clip toward the support.

The opposed ends of the molding clip are provided with integral tangs 48, struck from the body of the clip. The opposed edges of the tangs, 50, are substantially perpendicular to the plane of the support surfaces, and provide locking faces for engagement by the opposed lateral flanges 52 and 54 of the molding device.

The key hole slot 46 of the molding clip has an enlarged opening 60 which receives the button head 34 therethrough, and a slot portion 62. The body portion of the clip adjacent the slot portion defines a button seat, which is received beneath and tensioned against the underside of the enlarged button head. In this embodiment of my invention, the communication to the button seat is restricted by a series of teeth 64, which extend from the body portion of the clip into the key hole slot, to inhibit withdrawal of a button from the button seat. The teeth 64 of this embodiment extend at an acute angle to the axis of the slot, generally away from the enlarged key hole opening 60, to permit seating of a button within the slot portion 62, while preventing its withdrawal. In this embodiment of the molding clip, the width of the slot portion 62, at a tooth 64, is slightly less than the diameter of a button shank. And a second slot 66, adjacent and generally parallel to the key hole slot portion 62, is provided in the body portion of the clip to provide the required resiliency to allow a button to be seated in the slot portion, past the teeth 64.

The molding device 26 of this embodiment of my invention completely conceals the molding clip 24, and the button 22. The molding has a pair of angularly related portions, 56 and 58, which are complementary to, and overlie the angularly related surfaces of the support, 32 and 36 respectively.

In the assembly operation, the clip is secured to the support by disposing the enlarged key hole opening 60 over the button head 34, and shifting the clip toward the button to seat the button within the slot 62, and tensions the end of the clip 40 against the opposed support surface 36. The molding 26 is then secured to the clip by seating the inwardly extending lateral flange 54 of the molding against the tang face 50, and urging the opposed lateral flange 52 to snap over and lock against the opposed tang face.

It can be seen from FIGURE 2 that the molding in this embodiment is firmly retained on the clip, without the requirement of a clip portion overlying the molding. The locking interference of the tangs may be illustrated by an arc, 70 or 71 in FIGURE 2, generated from either tang face 50, adjacent the support. Either arc will pass through the opposed tang, and therefore the molding can not be removed without expanding the ends of the molding over the tangs. The molding assembly of this invention thereby provides the aesthetic value of a concealed molding clip and button, without sacrificing requisite safety requirements.

The molding clip illustrated in FIGURES 1 to 3 has been provided with reinforcements in the form of channels 72 struck from the body portion of the clip, however, such reinforcements may take various forms, or be eliminated as shown in FIGURES 4 and 5.

The embodiment of the molding clip 124 of FIGURES 4 and 5 is quite similar to the embodiment shown in FIGURES 2 and 3, and therefore I will only briefly describe the distinctions. The remainder of the molding assembly elements shown in FIGURE 4 may be identical to FIGURE 2, and have been numbered accordingly.

In this embodiment of the molding clip, only one lateral flange of the molding 52 is lockingly received on a tang means, 148, while the opposite flange 54 is received beneath the inwardly extending end 140 of the clip. The tang means has been provided with a laterally extending lip 100 which spaces the molding flange 52 from the support surface, 32, to prevent contact therebetween or scratching of the support. The end of the lip 100 is turned upwardly from the support, as is the support contacting lateral flange of the molding 54, to prevent scratching of the support during asembly. It can be seen from a comparison of FIGURES 3 and 5 that the molding clip embodiment of FIGURE 5 has a single centrally located tang 148, while the embodiment of FIGURE 3 has a pair of spaced tangs 48 adjacent both ends. A further distinction is that this embodiment has not been provided with linear structural reinforcements, such as the channels 72 of FIGURES 2 and 3.

In assembly, the molding clip is secured to the support as described in relation to FIGURE 2. The molding is then secured to the clip by disposing the inturned lateral flange 54 of the molding beneath the downwardly tensioned end 140 of the clip, and urging the opposed molding face 56 toward the support to expand the molding. Under this pressure, the lateral flange 52 of the molding will snap into the channel 102 between the tang 148 and the upturned lip 100, and be retained against the tang face 150. It should be noted from FIGURE 4, that a portion 104 of the molding clip is tensioned against the underside of the molding, while the end 140 tensions the lateral edge 54 of the molding against the support.

The embodiment of the molding assembly and clip shown in FIGURES 6 to 8 embodies many of the principles taught in FIGURES 1 to 5, and was designed for the same function. However, many of the construction details have been changed, as will be described hereinbelow.

In the embodiment shown in FIGURES 6 to 8, the molding assembly includes a button 220 secured to a support 222 such as an automotive body panel, a molding 226 received directly over the support, and a molding clip, 224, tensioned beneath the button head 234 against the molding.

As described hereinabove, the support has a pair of angularly related portions 232 and 234 which may define the corner of an automobile wheel opening. The molding has an aperture 200, which receives the button 220 therethrough, defined in a lateral wall portion 256 which closely overlies the inwardly extending body panel 232 of the wheel opening. The molding lateral wall 256 terminates in an upwardly extending flange 202, whose function is described hereinbelow. The opposed end 254 of the molding extends from within the wheel opening to overlie the exposed body panel 236, and define a pair of angularly related wall portions 256 and 258 which complement and overlie the angularly related support surfaces 232 and 236, respectively, and a mid portion 257 which overlies the juncture of the support surfaces.

Similar to the clip of FIGURES 1 to 5, the molding clip of this embodiment has a pair of opposed ends 238 and 240 which are tensioned toward the support 222, and a mid portion 242, bowed from the plane of the ends, to be tensioned beneath the button head 234. In this embodiment, however, the molding clip overlies the molding, and the opposed ends are spaced axially on one of the angularly related molding and support surfaces. The ends, 206 and 208 may be turned from the support, as shown, to prevent scratching of the molding during assembly.

The slot portion 262 of the key hole slot 246, and therefore the generally parallel adjacent slot 266, is disposed at an acute angle to the lateral edge 204 of the clip, so that the lateral edge of the clip is tensioned against the upwardly extending lateral flange 202 of the molding, as the molding is seated in the key hole slot. This relationship firmly locks the molding in position against the vibrational and shock forces encountered in automotive applications. The other features of the key hole slot are similar to those described hereinabove.

In assembly, the aperture 200 of the molding is disposed over the button, and the molding is held in place. Next, a series of clips are secured over the molding by disposing the enlarged opening 260 of the key hole slot over a button head 234, and shifting the clip axially to seat the button in the slot portion 262, beyond one or more of the teeth 264. The adjacent parallel slot 266 provides the resiliency in the clip required to seat the button in the slot portion, as described hereinabove, and the relative angle of the slot tensions the lateral edge 204 of the clip against the molding flange 202, as the clip is shifted into position.

Various materials may be used for all parts of the molding assembly, however the automotive industry utilizes metal primarily for the automotive support, the button, the molding clip, and the molding device. Steel is used primarily for the molding support, with stainless steel being used for the button, as well as cold rolled zinc plated steel. The molding clip may be fabricated from sheet metal stock in a continuous die operation. The buttons are stud welded to a prefabricated automotive support, before painting, or at least before final finishing, in a predetermined orientation. After cleaning, coating, and polishing, the automotive support is ready to receive the molding assembly.

While the molding assembly, clip and button have been described with reference to certain embodiments and arrangement of elements, it is understood by those skilled in the art that various modifications may be made to the embodiments disclosed without departing from the purview of the appended claims or the invention as disclosed herein. For example, various features of the three embodiments disclosed may be interchanged, such as providing a lip, similar to 100 in FIGURE 4, on the embodiment of FIGURE 2, or disposing the lateral flange 54 of FIGURE 1 beneath the end 40 of the molding clip. Further, the tang faces 50 and 150 of FIGURES 2 and 4 may be defined at an acute angle to the support surfaces, such that the faces overlie the molding ends to assure retention of the molding under more severe conditions.

What is claimed is:

1. A clip means for securing a molding device in overlying relation to a support having a headed button secured thereto, comprising: a body portion having a button receiving key hole slot including an enlarged opening which receives the head portion of a button therethrough, and a slot portion having a series of spaced teeth extending from one side thereof into said slot portion to inhibit withdrawal of a button received within said slot portion, and a second slot substantially parallel to the slot portion of said key hole slot which provides the resiliency of said body portion which allows a button to be seated in said slot portion beyond said teeth.

2. The clip means defined in claim 1, characterized in that said teeth extend at an acute angle to the axis of said slot portion generally away from said enlarged opening.

3. A molding assembly, comprising: a support, a button having a shank portion secured to said support and an enlarged head portion extending from the outer surface thereof, a clip means having a key hole slot defined therein, said key hole slot having an enlarged opening adapted to receive said enlarged button head therethrough and a slot portion having adjacent side edges received beneath and tensioned against the underside of said enlarged button head, said slot portion having a restricted channel whose width is less than the diameter of said button shank to inhibit withdrawal of the button through said channel, said clip means having a second slot adjacent said key hole slot substantially parallel to said slot portion which provides the resiliency in said clip means to allow said button to be seated in said slot portion beyond said restricted channel, and a molding device secured by said clip means in overlying relation to said support.

4. The molding assembly defined in claim 3, characterized in that said clip means is tensioned beneath said button head toward said surface of said support, and said molding device is received over said clip means, said molding device having opposed lateral flanges extending towards said support which are expanded to be lockingly received over opposed edges of said clip means.

5. A molding assembly, comprising: a support having a pair of angularly related surfaces, a button having a shank portion secured to one of said surfaces and an enlarged head portion spaced from the surface, a generally C-shaped resilient sheet metal clip overlying the junction of said angularly related support surfaces having a key hole slot adapted to receive the enlarged head of the button therethrough including a slot extending generally toward the midportion of the clip receiving the shank portion of said button, said slot portion having a restricted channel whose width is less than the diameter of said button shank, said midportion spaced from said support and tensioned beneath the button head, the opposed edges of said clip tensioned against each of the angularly related surfaces of the support, and a hollow molding device expanded to be received over said opposed edges of the clip and tensioned thereagainst in substantially concealing relation to retain the molding device to the support.

6. The molding assembly defined in claim 5, characterized in that said molding device is provided with opposed lateral flanges which extend toward said support, and are lockingly received over said opposed edges of said clip.

7. The molding assembly defined in claim 6, characterized in that one of said opposed flanges of said molding device is curled beneath said opposed edges of said clip means and is tensioned against one of said angularly related surfaces.

8. The molding assembly defined in claim 6, characterized in that a tang means has been struck from said clip means adjacent one of said opposed edges and said opposed edge terminates in a lip portion, and one of said molding flanges is tensioned against said tang means on said lip portion.

9. The molding assembly defined in claim 8, characterized in that the opposite flange of said molding device is tensioned against an opposed tang means on the opposite edge of said clip means and on said support.

10. The molding assembly defined in claim 6, characterized in that said clip means is provided with a pair of generally parallel slots, one of said slots having an enlarged opening adapted to receive said enlarged button head and a slot portion having adjacent side edges received beneath and tensioned against the underside of said button head.

11. The molding assembly defined in claim 10, characterized in that said adjacent side edges of said slot portion are provided with teeth extending generally away from said enlarged opening at an acute angle to the axis of said slot portion which inhibits withdrawal of a button received within said slot portion.

12. The molding assembly defined in claim 10, characterized in that said clip means is provided with integral reinforcement ribs generally parallel to said slots.

13. A molding assembly, comprising: a support having a pair of generally right angularly related surfaces and a button secured to one of said support surfaces, a clip means having a pair of angularly related body portions overlying the angularly related support surfaces and secured to the support by said button, one of the opposed edges of said clip extending from the support at generally a right angle, and a hollow longitudinal molding device received over said clip means in substantially concealing relation, one lateral edge of said molding device curled therebeneath to engage one opposed edge of said clip means, and the other latral edge of said molding device extending substantially perpendicular to the support surface and expanded over the right angle edge of said clip means such that said molding device cannot be removed except by expanding the edge of said molding device over the right angle edge of the clip.

References Cited

UNITED STATES PATENTS

| | | | |
|---|---|---|---|
| 909,561 | 1/1909 | Dolcater | 5—299 |
| 1,261,835 | 4/1918 | Martin | 5—299 |
| 2,610,375 | 9/1952 | Churchill | 52—718 |
| 2,644,213 | 7/1953 | Bedford | 287—189.35 |
| 2,798,406 | 7/1957 | Steck | 85—36 |
| 3,138,225 | 6/1964 | Jansson | 52—718 X |
| 3,188,730 | 6/1965 | Meyer | 52—718 X |
| 3,246,440 | 4/1966 | Meyer | 52—718 |

FRANCIS K. ZUGEL, *Primary Examiner.*